(12) United States Patent
Wu et al.

(10) Patent No.: US 8,100,484 B2
(45) Date of Patent: Jan. 24, 2012

(54) COMPUTER ENCLOSURE

(75) Inventors: Chia-Kang Wu, Taipei Hsien (TW);
Li-Ping Chen, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 323 days.

(21) Appl. No.: 12/436,933

(22) Filed: May 7, 2009

(65) Prior Publication Data
US 2010/0117497 A1 May 13, 2010

(30) Foreign Application Priority Data
Nov. 13, 2008 (CN) .......................... 2008 2 0302770

(51) Int. Cl.
*A47B 81/00* (2006.01)
*H05K 7/02* (2006.01)

(52) U.S. Cl. ........... 312/223.2; 361/679.02; 361/679.58; 292/137; 292/DIG. 11; 292/DIG. 63

(58) Field of Classification Search ............... 312/223.2, 312/265.5, 265.6, 257.1; 292/137, 138, 145, 292/150, DIG. 11, DIG. 63; 361/679.02, 361/679.58, 679.6, 752, 753, 754, 759, 760
See application file for complete search history.

(56) References Cited

U.S. PATENT DOCUMENTS

| | | | | |
|---|---|---|---|---|
| 4,597,599 A * | 7/1986 | Bisbing | ......................... | 292/174 |
| 5,383,793 A * | 1/1995 | Hsu et al. | ...................... | 439/327 |
| 5,457,608 A * | 10/1995 | Scholder et al. | ............. | 361/752 |
| 5,822,193 A * | 10/1998 | Summers et al. | ............. | 361/759 |
| 5,996,962 A * | 12/1999 | Chang et al. | .................. | 248/694 |
| 6,339,535 B1 * | 1/2002 | Gahl | ............................ | 361/801 |
| 6,424,537 B1 * | 7/2002 | Paquin et al. | ................. | 361/752 |
| 6,424,538 B1 * | 7/2002 | Paquin | .......................... | 361/752 |
| 6,695,629 B1 * | 2/2004 | Mayer | ............................. | 439/92 |
| 6,752,276 B2 * | 6/2004 | Rumney | ..................... | 211/41.17 |
| 6,781,055 B2 * | 8/2004 | Chen | ............................. | 174/535 |
| 6,885,565 B2 * | 4/2005 | Shi | ................................ | 361/801 |
| 7,028,389 B2 * | 4/2006 | Chang | ............................. | 29/739 |
| 7,245,496 B1 * | 7/2007 | Luo et al. | ...................... | 361/742 |
| 7,278,872 B2 * | 10/2007 | Brown et al. | ................. | 439/351 |
| 7,385,830 B2 * | 6/2008 | Liu et al. | ....................... | 361/810 |
| 7,609,508 B2 * | 10/2009 | Chen et al. | ............... | 361/679.33 |
| 7,716,503 B2 * | 5/2010 | Chang et al. | ................. | 713/300 |
| 7,782,611 B2 * | 8/2010 | Yeh et al. | .................. | 361/679.57 |
| 7,787,258 B2 * | 8/2010 | Cheney et al. | ............... | 361/801 |
| 2003/0137226 A1 * | 7/2003 | Liao | .......................... | 312/223.2 |
| 2005/0088068 A1 * | 4/2005 | Chang | ........................ | 312/265.5 |
| 2005/0168116 A1 * | 8/2005 | Chuang | ...................... | 312/265.5 |
| 2006/0114662 A1 * | 6/2006 | Liu et al. | ....................... | 361/759 |
| 2006/0128200 A1 * | 6/2006 | McEwan et al. | .............. | 439/327 |
| 2006/0267463 A1 * | 11/2006 | Peng et al. | ................. | 312/223.2 |
| 2007/0013275 A1 * | 1/2007 | Chen | .......................... | 312/223.2 |
| 2008/0116774 A1 * | 5/2008 | Chen et al. | ................. | 312/223.2 |
| 2009/0073645 A1 * | 3/2009 | Tsai et al. | ................... | 361/679.6 |
| 2009/0102334 A1 * | 4/2009 | Chen et al. | ................. | 312/223.2 |
| 2009/0261695 A1 * | 10/2009 | Yeh et al. | ................... | 312/223.2 |
| 2009/0284915 A1 * | 11/2009 | Tsai et al. | ............... | 361/679.58 |
| 2010/0117497 A1 * | 5/2010 | Wu et al. | ..................... | 312/223.2 |
| 2010/0254078 A1 * | 10/2010 | Zheng et al. | ............. | 361/679.02 |

\* cited by examiner

*Primary Examiner* — Darnell Jayne
*Assistant Examiner* — Joshua Rodden
(74) *Attorney, Agent, or Firm* — Altis Law Group, Inc.

(57) ABSTRACT

A computer enclosure includes a base and a mounting bracket. The base includes a mounting pole. The mounting bracket includes a mounting mechanism. The mounting mechanism includes a mounting member. The mounting member is movable perpendicular to a longitudinal axis of the mounting pole, and the mounting member is capable of removeably retaining the mounting pole thereto to thereby releasably connect the base to the mounting bracket.

10 Claims, 6 Drawing Sheets

COMPUTER ENCLOSURE

BACKGROUND

1. Technical Field

The present disclosure relates to a computer enclosure which can be conveniently assembled and disassembled.

2. Description of Related Art

Computer enclosures often include a base and a mounting bracket installed thereon. The base includes a bottom panel and a motherboard installed on the bottom panel. The mounting bracket includes a mounting plate and a plurality of expansion cards mounted thereon. The expansion cards are received in the corresponding slots of the motherboard, and the mounting plate of the mounting bracket is usually mounted on the base with many fasteners, thereby securing the mounting bracket to the base to complete assembly of the computer enclosure. This process, for both assembly and disassembly, is laborious, time-consuming, and inconvenient.

What is needed, therefore, is a computer enclosure which can be conveniently assembled and disassembled.

DETAILED DESCRIPTION

Figure 1:
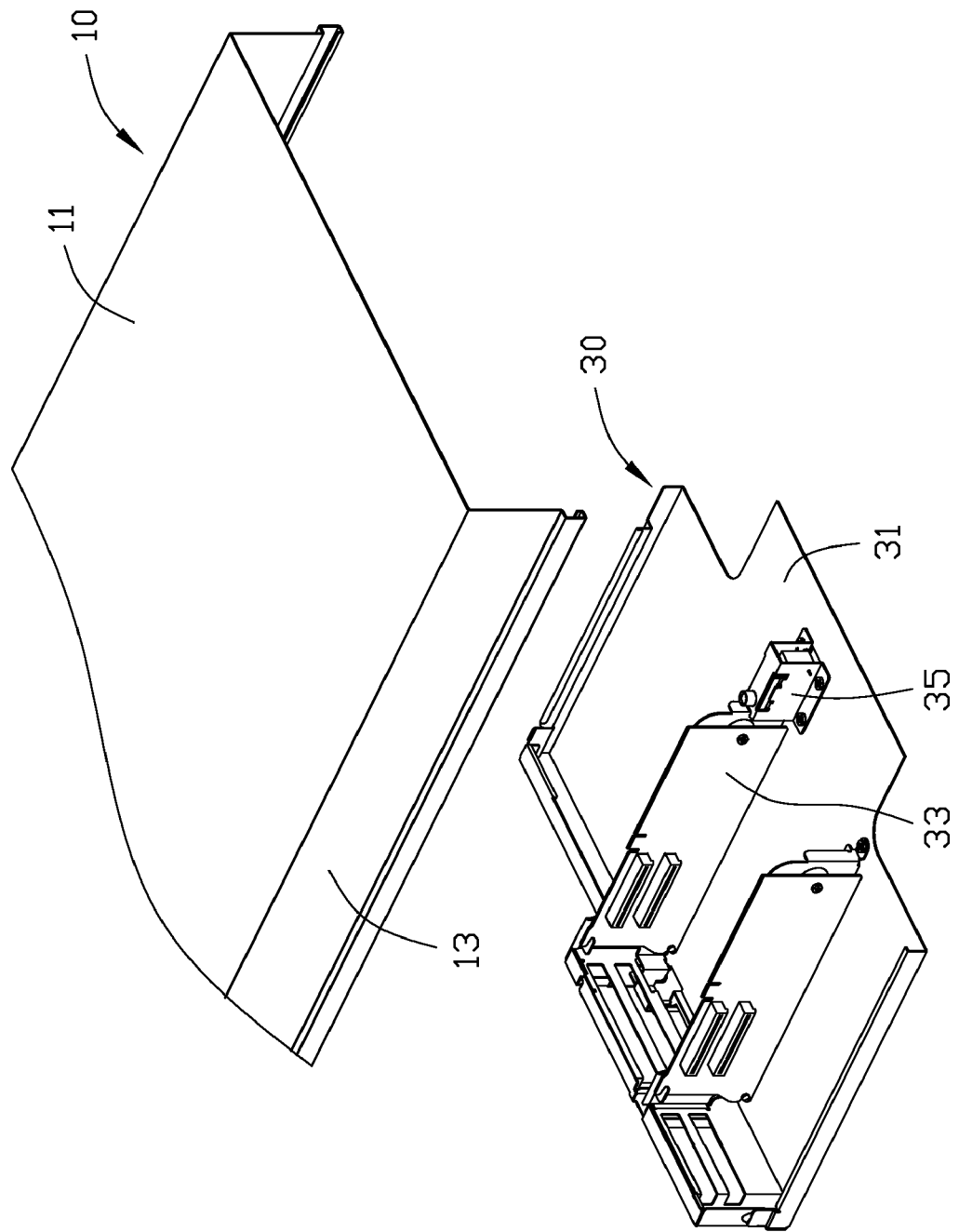
FIG. 1 is an exploded, isometric view of an embodiment of a computer enclosure.
Figure 2:
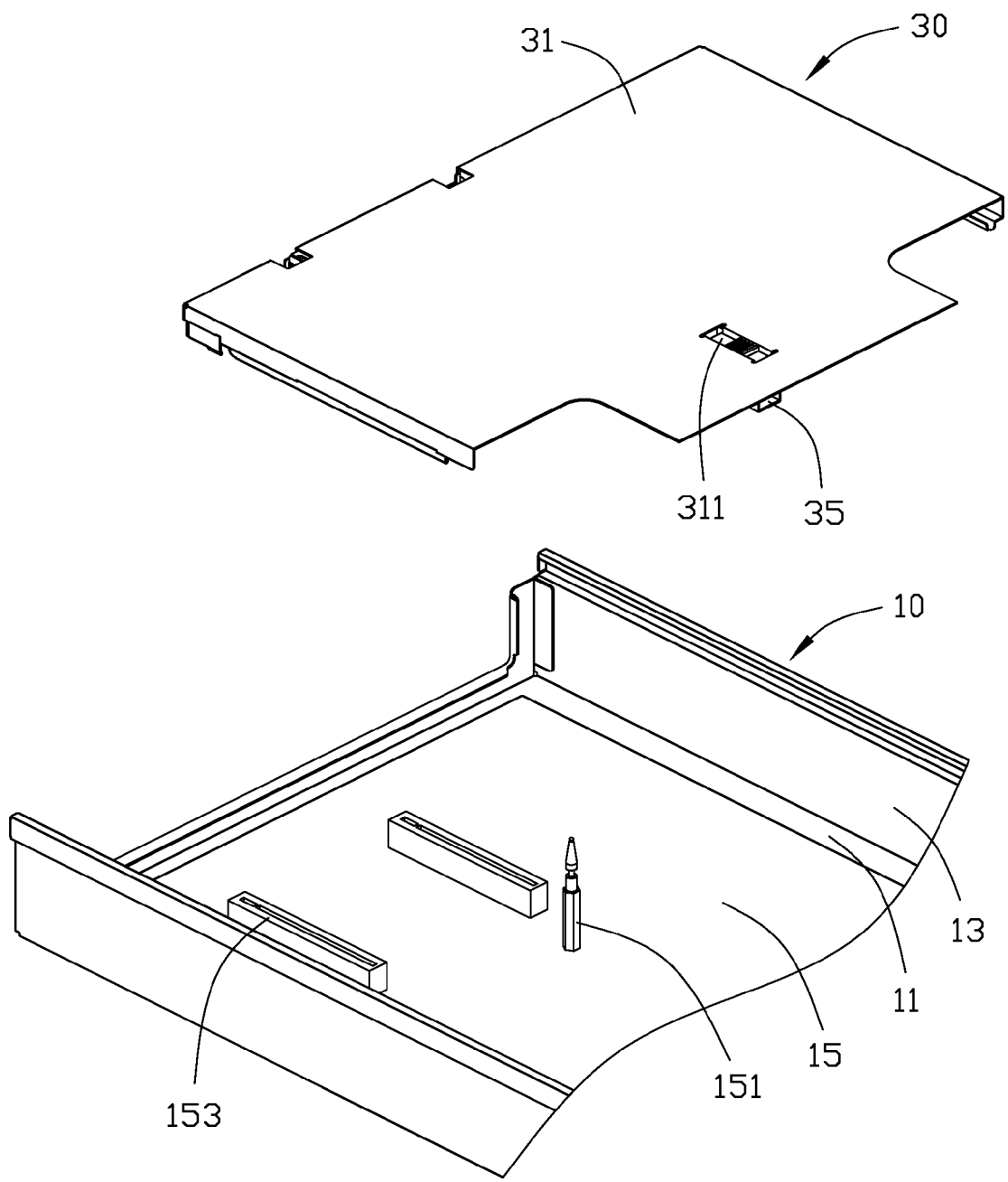
FIG. 2 is similar to FIG. 1, but viewed from another aspect.

Referring from FIG. 1 to FIG. 2, an embodiment of a computer enclosure includes a base 10, and a mounting bracket 30 detachably mounted to the base 10. The base 10 includes a bottom panel 11, two parallel side panels 13 extending substantially perpendicularly from opposite edges of the bottom panel 11, and a motherboard 15 mounted to the bottom panel 11. Two slots 153 are disposed on the motherboard 15, and a mounting pole 151 protrudes perpendicularly from the motherboard 15 adjacent to the slots 153. The mounting bracket 30 includes a mounting plate 31, and the mounting pole 151 on the motherboard 15 protrudes towards the mounting plate 31. Two expansion cards 33 are mounted on the mounting plate 31 and received in the corresponding slots 153 of the motherboard 15. An opening 311 is defined on the mounting plate 31 adjacent to one side of the expansion cards 33. A mounting mechanism 35 is mounted on the mounting plate 31 corresponding to the mounting pole 151 of the motherboard 15. The mounting mechanism 35 has a portion extending through the opening 311.

Figure 3:
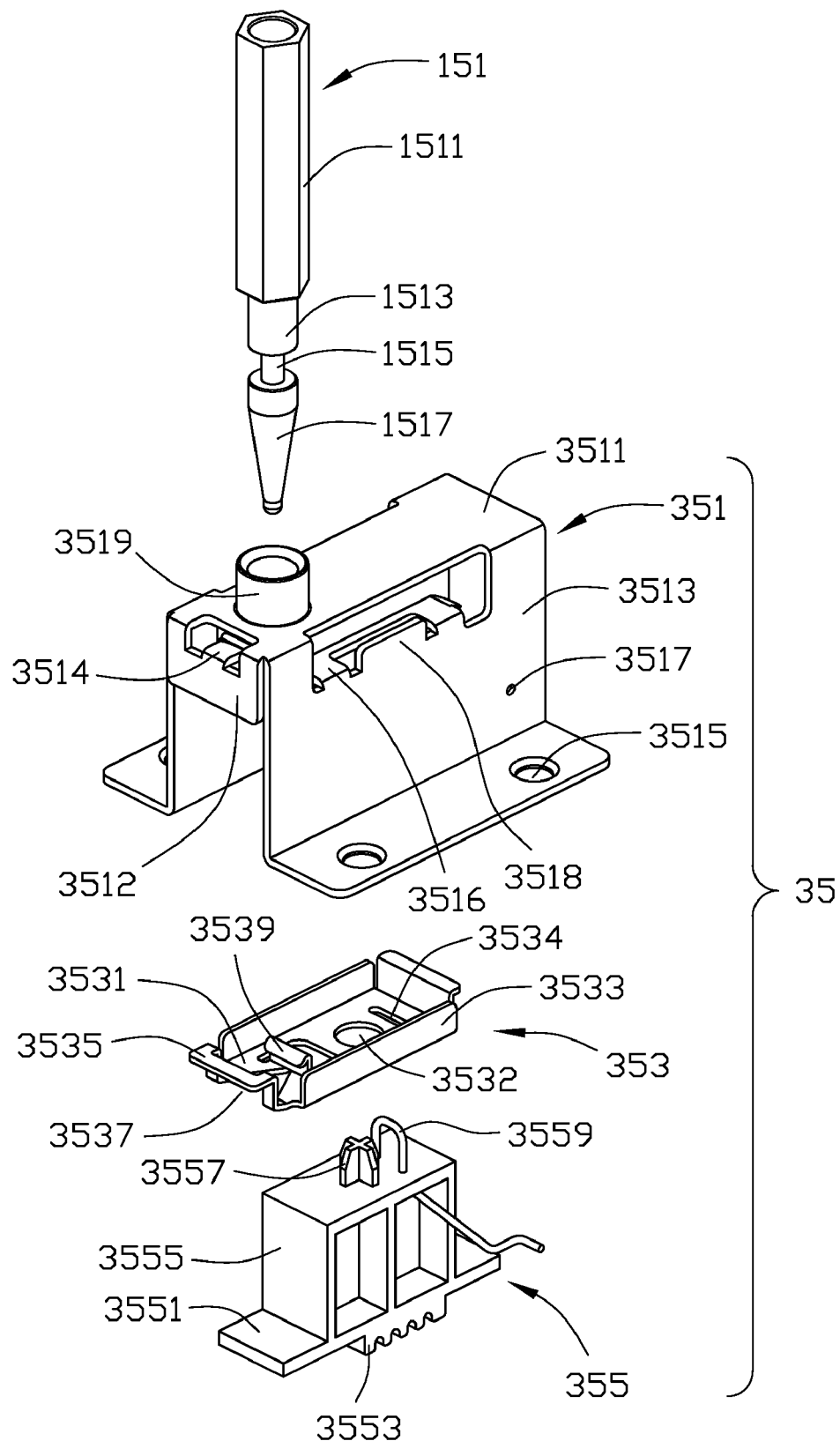
FIG. 3 is an exploded, isometric view of a mounting pole and a mounting mechanism of FIG. 1.

Referring to FIG. 3, the mounting pole 151 includes a supporting portion 1511 mounted on the motherboard 15, a shaft portion 1513 extending from the supporting portion 1511, a connecting portion 1515, and a conical guide portion 1517. The guide portion 1517 includes a head portion with small diameter and a large diameter portion adjacent to the connecting portion 1515. A cross sectional area of the shaft portion 1513 is less than that of the supporting portion 1511. The connecting portion 1515 is formed between the shaft portion 1513 and the guide portion 1517, and a diameter of the connecting portion 1515 is less than that of the shaft portion 1513 and the bottom portion of the guide portion 1517, thereby forming a ring-shaped retaining slot between the shaft portion 1513 and the guide portion 1517.

The mounting mechanism 35 includes an assembly member 351 mounted to the mounting plate 31 and a mounting member slideably mounted in the assembly member 351. The mounting member includes a locating member 353 installed in the assembly member 351, and a sliding member 355 mounted on the locating member 353.

The assembly member 351 includes a top wall 3511 and two angled walls 3513 extending substantially perpendicularly from opposite edges of the top wall 3511. Each angled wall 3513 has an L-shaped structure, including a first face perpendicular to the top wall 3511, and a second perpendicular mounting face. A pivot hole 3517 is defined in each first face, and two through holes 3515 are defined in each second perpendicular mounting face for fixing the mounting mechanism 35 on the mounting plate 31. A collar 3519 protrudes perpendicularly from the top wall 3511, and the collar 3519 has a mounting hole running through the top wall 3511, thereby forming an inner surface and an outer surface in the collar 3519. A diameter of the collar 3519 is larger than that of the shaft portion 1513 and the bottom portion of the guide portion 1517, such that the guide portion 1517 and the shaft portion 1513 of the mounting pole 151 can be received in the mounting hole of the collar 3519. When the guide portion 1517 and the shaft portion 1513 are received in the mounting hole of the collar 3519, one end of the supporting portion 1511 abuts a top end of the collar 3519. An angled piece 3512 extends substantially perpendicularly from one edge of the top wall 3511 between the two angled walls 3513, and a supporting piece 3514 is formed in a connection of the angled piece 3512 and the top wall 3511. A locating piece 3516 angles perpendicularly from a connection of each angled wall 3513 and the top wall 3511. A blocking piece 3518 protrudes from each locating piece 3516 on the same surface as the first face of the corresponding angled wall 3513.

The locating member 353 includes a bottom plate 3531, two side plates 3533 extending substantially perpendicular from two opposite edges of the bottom plate 3531, and two angled plates 3535 extending substantially perpendicular from the other two opposite edges of the bottom plate 3513. An engaging portion 3537 is defined in a connection between the one of the angled plates 3535 and the bottom plate 3513, and the engaging portion 3537 defines a triangular opening. A resilient piece 3539 protrudes from the bottom plate 3531 adjacent to the engaging portion 3537. A round hole 3532 and a groove 3534 are correspondingly defined in the bottom plate 3531 adjacent to the resilient piece 3539.

The sliding member 355 includes a rectangular sliding wall 3551 and a sawtooth-shaped operating portion 3553 on one side thereof, and a connecting member 3555 extending perpendicularly from the other side. A securing portion 3557 protrudes from a top side of the connecting member 3555, received in the round hole 3532 of the locating member 353. A resilient component 3559 is mounted to the connecting member 3555 adjacent to the securing portion 3557. A top angled portion of the resilient component 3559 is seated and secured in the groove 3534 of the locating member 353, and a free end of the resilient component 3559 pivotally extends through the pivot hole 3517 of the assembly member 351.

Figure 4:
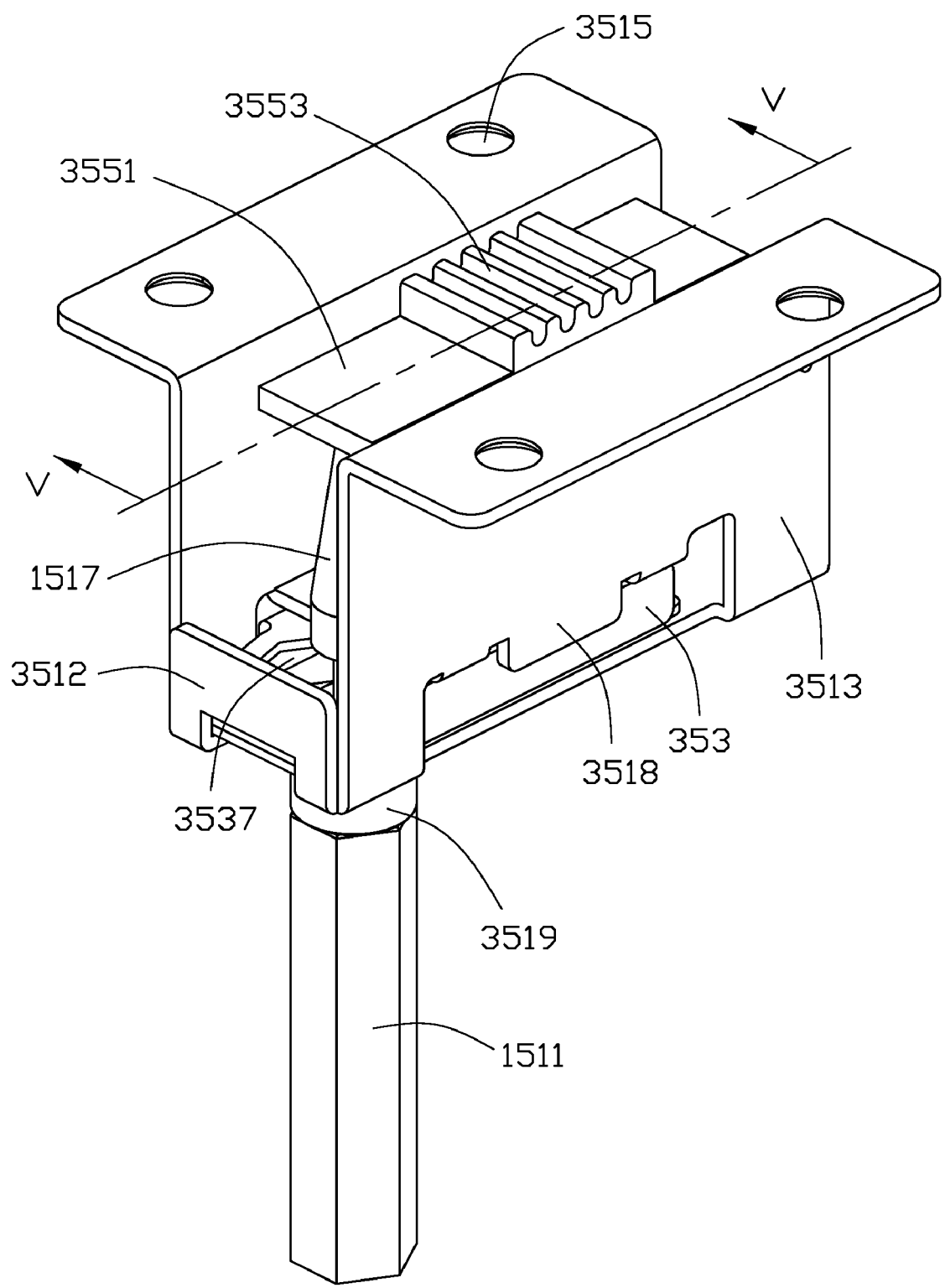
FIG. 4 is an assembled isometric view of the mounting pole and the mounting mechanism of FIG. 3.
Figure 5:
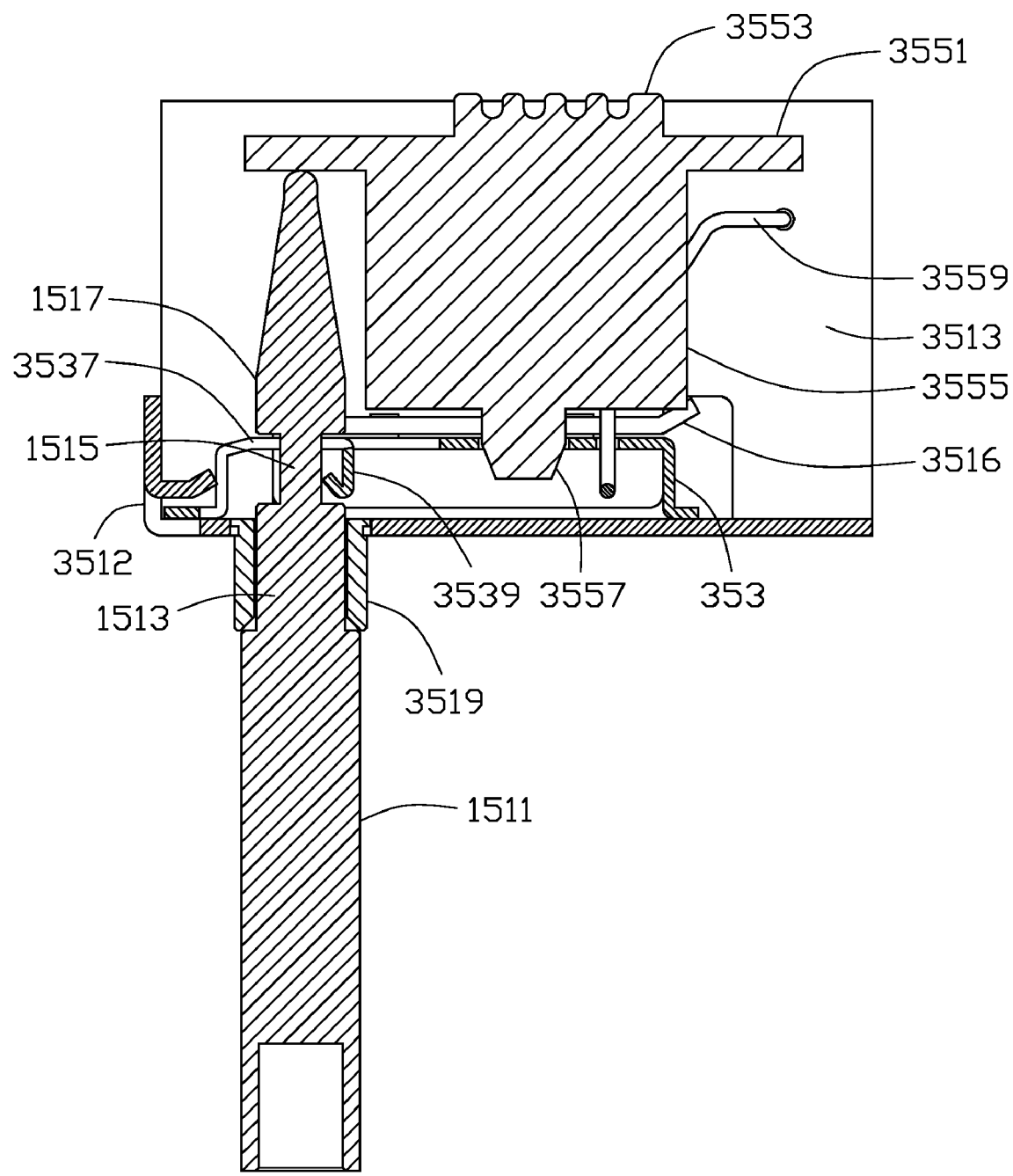
FIG. 5 is an assembled sectional view of the mounting pole and the mounting mechanism of FIG. 4.
Figure 6:
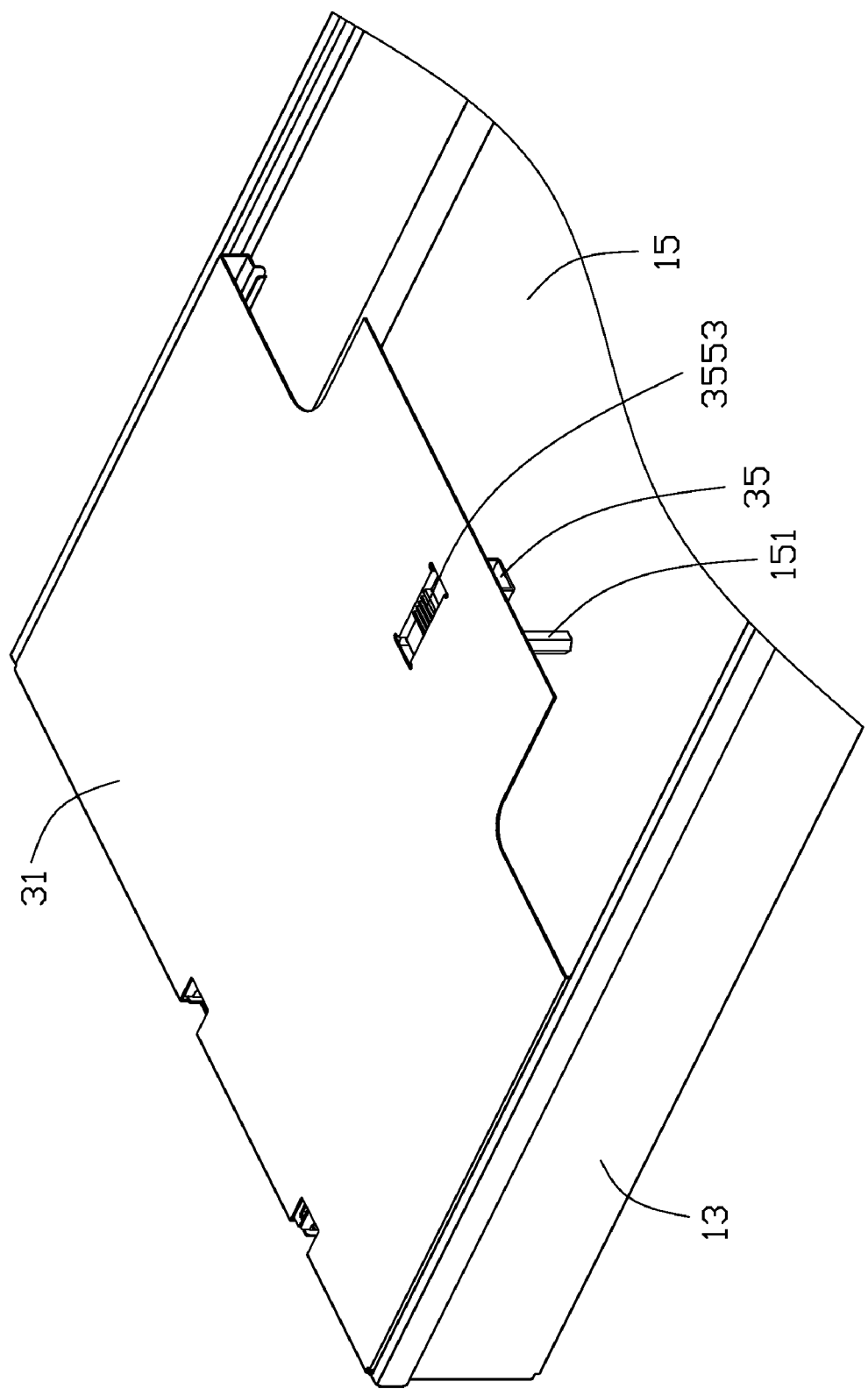
FIG. 6 is an assembled isometric view of the computer enclosure of FIG. 1.

Referring from FIGS. 4 and 6, in assembly, the locating member 353 is installed in the assembly member 351, the engaging portion 3537 of the locating member 353 aligns with the mounting hole of the collar 3519 of the assembly member 351. The two opposite edges of the bottom plate 3531 abut the corresponding locating piece 3516, and the outer surfaces of the two side plates 3533 of the locating member 353 abut the inner surfaces of the corresponding blocking pieces 3518. The sliding member 355 is installed in the assembly member 351, the securing portion 3557 of the sliding member 355 is secured in the round hole 3532 of the locating member 353. The top angled portion of the resilient component 3559 runs through and is secured in the groove 3534 of the locating member 353, and the free end of the resilient component 3559 pivotally extends through the pivot hole 3517 of the assembly member 351. Two opposite edges of the sliding wall 3551 of the sliding member 355 abut the inner surfaces of the corresponding vertical walls of the assembly member 351, and assembly of the mounting mechanism 35 is complete. The mounting mechanism 35 is mounted to the mounting plate 31, and the operating portion 3553 of the mounting mechanism 35 is exposed to the opening 311. The mounting bracket 30 is impelled towards the motherboard 15 of the base 10, and the expansion cards 33 are aligned with the corresponding slots 153 of the motherboard 15. The guide portion 1517 of the mounting pole 151 of the motherboard 15 is received in the mounting hole of the collar 3519 of the mounting mechanism 35. The guide portion 1517 presses against the resilient piece 3539 of the locating member 353 and the two inner edges of the engaging portion 3537 to move the sliding member 355 and the locating member 353 away from the mounting pole 151 perpendicular to the mounting pole 151, whereupon the resilient component 3559 elastically deforms. When the connecting portion 1515 of the mounting pole 151 aligns with the engaging portion 3537, the resilient component 3551 returns to its original state, and the two inner edges of the engaging portion 3537 and a free end of the resilient piece correspondingly engage in the ring-shaped retaining slot of the mounting pole 151. One end of the supporting portion 1511 abuts the top end of the collar 3519, and the expansion cards 33 are received in the corresponding slots 153 of the motherboard 15, completing assembly of the computer enclosure.

For disassembly, pressure on the operating portion 3553 deforms resilient component 3559 of the sliding member 355 elastically driving the locating member 353. The engaging portion 3537 of the locating member 353 and the resilient piece 3539 disengage from the ring-shaped retaining slot of the mounting pole 151. The mounting bracket 30 can then be removed from the base 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure, comprising:
a base, the base comprising a mounting pole; and
a mounting bracket comprising a mounting mechanism, the mounting mechanism comprising a mounting member; wherein the mounting member is movable perpendicular to a longitudinal axis of the mounting pole, and the mounting member is capable of retaining the mounting pole thereto; the mounting member comprises a locating member, the locating member comprises an engaging portion, the engaging portion defines a triangular opening, the mounting pole comprises a conical guide portion and defines a ring-shaped retaining slot, the conical guide portion is adapted to bias the locating member at the triangular opening away from an original position, and the engaging portion is adapted to engage the ring-shaped retaining slot when the locating member is back to the original position;
wherein the mounting member comprises a sliding member mounted on the locating member, and the sliding member is adapted to slide along a direction perpendicular to the mounting pole when the mounting pole is inserted into the mounting mechanism;
the mounting bracket comprises a mounting plate; and the mounting mechanism comprises an assembly member mounted to the mounting plate, and the mounting member is adapted to slide relative to the assembly member;
a pivot hole is defined in the assembly member, the mounting mechanism further comprises a resilient component located on the sliding member; the pivot hole is configured to receive a free end of the resilient component; and the assembly member further comprises a collar with a mounting hole for receiving the mounting pole.

2. The computer enclosure of claim 1, wherein the locating member comprises a bottom plate in one side of which the engaging portion is defined, and defines a hole and a groove for respectively securing the resilient component of the sliding member and a securing portion protruding from the sliding member.

3. The computer enclosure of claim 1, wherein the sliding member further comprises an operating member, and the operating member is sawtooth-shaped.

4. The computer enclosure of claim 1, wherein at least one expansion card is installed on the mounting bracket and a slot is disposed on the base, in which the expansion card is received when the mounting member is engaged with the mounting pole.

5. A computer enclosure, comprising:
a base from which a mounting pole protrudes perpendicularly, the mounting pole comprising a shaft portion;
a mounting bracket detachably mounted to the base, on which a mounting mechanism is mounted, a collar protruding perpendicularly from the mounting mechanism, and the collar comprising a mounting hole, the mounting mechanism comprising a mounting member;
wherein the mounting mechanism is capable of engaging the shaft portion, and the mounting member is slidable towards the mounting pole to engage the mounting pole and secure the base with the mounting bracket;
a ring-shaped retaining slot is defined in the mounting pole, the mounting member comprises an engaging portion, the engaging portion defines a triangular opening, and is configured to engage the mounting pole; the mounting member comprises a locating member and a sliding member mounted on the locating member, the engaging portion is defined in the locating member, the sliding member slides along a direction perpendicular to the mounting pole to engage or disengage the ring-shaped retaining slot with the engaging portion; the mounting bracket comprises a mounting plate, the mounting mechanism comprises an assembly member mounted to the mounting plate, and the mounting member is adapted to slide relative to the assembly member; wherein a resilient component is installed on the sliding member, a pivot hole is defined in the assembly member for receiving a free end of the resilient component, the assembly member further comprises the collar with the mounting hole for receiving the mounting pole.

6. The computer enclosure of claim 5, wherein the mounting pole comprises a conical guide portion configured to press against the engaging portion to cause the engaging portion of the mounting member to move away from the ring-shaped retaining slot of the mounting pole in a direction perpendicular to the mounting pole.

7. The computer enclosure of claim 5, wherein the locating member comprises a bottom plate, the engaging portion is defined in one side of the bottom plate, a groove and a hole are defined in the bottom plate for respectively securing the resilient component of the sliding member and a securing member extending from the sliding member.

8. The computer enclosure of claim 5, wherein the sliding member further comprises an operating member, and the operating member is sawtooth-shaped.

9. The computer enclosure of claim 5, wherein at least one expansion card is installed on the mounting bracket, and a slot is disposed on the base, in which the expansion card is received when the mounting member is engaged in the ring-shaped retaining slot.

10. A computer enclosure, comprising:
a base, the base comprising a mounting pole, and the mounting pole comprising a conical guide portion; and
a mounting bracket comprising a mounting mechanism, the mounting mechanism comprising a mounting member and an assembly member,
wherein the mounting member comprises a locating member, the locating member is adapted to engage the mounting pole, and the conical guide portion is adapted to bias the locating member away relative to the assembly member along a direction substantially perpendicular to a longitudinal axis of the mounting pole, when the mounting pole moves towards the locating member;
the mounting member further comprises a sliding member mounted on the locating member, the locating member defines a groove, and the sliding member comprises a resilient component engaging with the groove;
a pivot hole is defined in the assembly member for receiving a free end of the resilient component.

* * * * *